(12) United States Patent
Akulavenkatavara et al.

(10) Patent No.: US 8,056,068 B2
(45) Date of Patent: Nov. 8, 2011

(54) MULTIPLEXING PER-PROBEPOINT INSTRUCTION SLOTS FOR OUT-OF-LINE EXECUTION

(75) Inventors: Prasadarao Akulavenkatavara, Portland, OR (US); Gerrit Huizenga, Portland, OR (US); James A. Keniston, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 11/853,224

(22) Filed: Sep. 11, 2007

(65) Prior Publication Data

US 2009/0070558 A1 Mar. 12, 2009

(51) Int. Cl.
*G06F 9/44* (2006.01)
*G06F 9/45* (2006.01)
(52) U.S. Cl. ........ 717/159; 717/130; 717/131; 717/141; 717/158

(58) Field of Classification Search ........................ None
See application file for complete search history.

(56) References Cited

U.S. PATENT DOCUMENTS 7,853,937 B2 * 12/2010 Janczewski .................... 717/149
2008/0127117 A1 * 5/2008 Panchamukhi et al. ........ 717/130

* cited by examiner

*Primary Examiner* — Chuck Kendall
(74) *Attorney, Agent, or Firm* — Cantor Colburn LLP; Steven Bennett

(57) ABSTRACT

The present invention provides a probe system and method for multithreaded user-space programs. The system includes an instrumentation module that enables single stepping out of line processing for multithreaded programs, an establish probepoint module that divides up an area of the probed program's memory into a plurality of instruction slots, an ensure slot assigned module that ensures that an instruction slot is assigned to a probepoint, a slot acquisition module that acquires the instruction slot for the probepoint, stealing a slot from another probepoint as needed, and a free slot module that relinquishes the instruction slot owned by the probepoint when the probepoint is being unregistered.

6 Claims, 4 Drawing Sheets

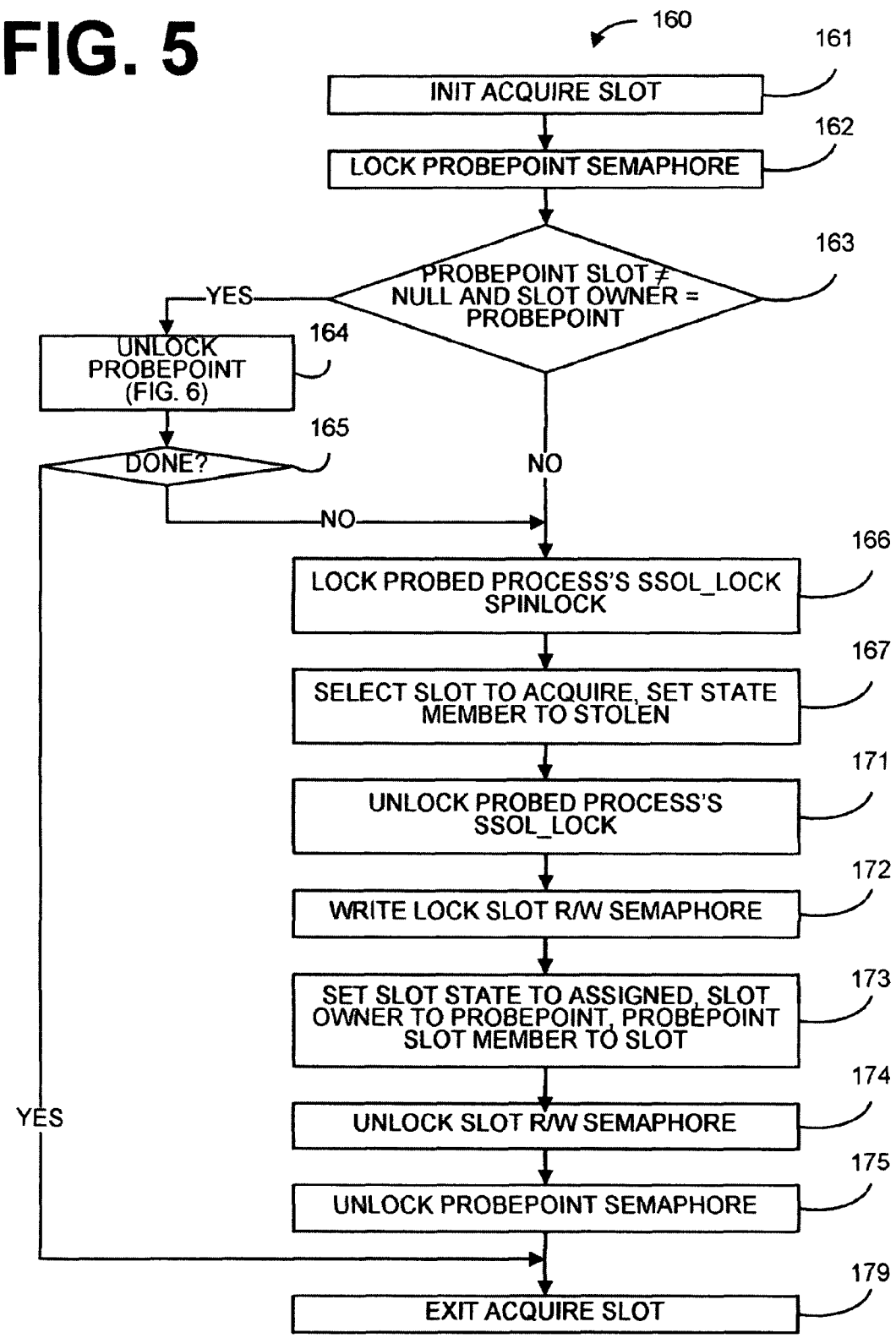

MULTIPLEXING PER-PROBEPOINT INSTRUCTION SLOTS FOR OUT-OF-LINE EXECUTION

BACKGROUND OF THE INVENTION

1. Field of the Invention

This invention generally relates to methods and apparatus for users-space probes, and in particular, user-space probes for multithreaded programs.

2. Description of Background

Currently, uprobes (i.e. user-space probes) is a feature of the Linux kernel that enables software developers to create, install, and remove ad hoc instrumentation for user-mode programs. Uprobes enables an instrumentation module to establish probepoints in the probed program. When any thread of the program hits a probepoint, uprobes runs the corresponding instrumentation function (handler), and then allows the thread to continue.

Uprobes implements a probepoint by replacing the first byte(s) of the instruction at the probepoint with a breakpoint instruction—after first saving a copy of the original instruction. After the breakpoint is hit and the handler has been run, uprobes needs to execute the original instruction in the context of the probed process. There are two commonly accepted ways to do this:

Single-stepping inline (SSIL): Temporarily replace the breakpoint instruction with the original instruction; single-step the instruction; restore the breakpoint instruction; and allow the thread to continue. This method is typically used by interactive debuggers, such as gdb.

Single-stepping out of line (SSOL): Place a copy of the original instruction somewhere in the probed process's address space; single-step the copy; "fix up" the thread state as necessary; and allow the thread to continue. If the effect of the instruction depends on its address (e.g., a relative branch), the thread's registers and/or stack must be "fixed up" after the instruction is executed (e.g., to make the program counter relative to the address of the original instruction, rather than the instruction copy). This method is used by kprobes (Kernel Probes).

The SSIL approach doesn't work acceptably for multithreaded programs—at least partly because while the breakpoint instruction is temporarily removed during single-stepping, another thread can sail past the probepoint.

SUMMARY OF THE INVENTION

Embodiments of the present invention provide a system and method for user-space probes for multithreaded programs. Briefly described, in architecture, one embodiment of the system, among others, can be implemented as follows.

The system includes an instrumentation module that enables single stepping out of line processing for multi-threaded programs, an establish probepoint module that divides up an area of the probed program's memory into a plurality of instruction slots, and an ensure slot assigned module that ensures that a instruction slot is assigned to a probepoint. The system further includes a slot acquisition module that acquires the instruction slot for the probepoint that steals a slot from another probepoint as needed, and a free slot module that relinquishes the instruction slot owned by the probepoint when the probepoint is being unregistered.

Embodiment of the present invention can also be viewed as providing methods for user-space probes for multithreaded programs. In this regard, one embodiment of such a method, among others, can be broadly summarized by the following steps. The method includes enabling single stepping out of line processing for multithreaded programs, dividing a memory area into a plurality of instruction slots, and ensuring that an instruction slot is assigned to a probepoint. The method further includes acquiring the instruction slot for the probepoint, stealing the slot from another probepoint as needed, and relinquishing the instruction slot owned by the probepoint when the probepoint is being unregistered.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 is a flow chart illustrating an example of the operation of the acquire slot assigned module on the computer that is utilized in the SSOL instrumentation system of the present invention, as shown in FIGS. 1 and 2.

The detailed description explains the preferred embodiments of the invention, together with advantages and features, by way of example with reference to the drawings.

DETAILED DESCRIPTION OF THE INVENTION

The exemplary invention SSOL instrumentation system allows a fixed-size single-stepping out of line (SSOL) area to serve for an unlimited number of probepoints in an unlimited number of threads. The SSOL area is allocated in the virtual address space of the probed process, and is divided into "instruction slots," each of which is large enough to hold the longest instruction in the architecture being probed. As probepoints are hit, one instruction slot per probepoint is assigned in the SSOL area until the number of probepoints ever hit exceeds the capacity of the SSOL area. When a probepoint is hit and there's no room for its instruction copy in the SSOL area, a slot is freed up by flushing a slot not currently in use.

The design of the SSOL area is guided by the following requirements. First, to minimize uprobes's impact on the probed process's address space. If one or more new virtual memory areas need to be added, the following issues are guidance. The fewer new virtual memory areas the better. The smaller the new virtual memory areas the better. Better to affect only probed processes. A fixed-size virtual memory area is better than growing/shrinking new virtual memory areas over time.

Second, it is important to handle an unlimited number of probepoints per process. Third, to be able to handle an unlimited number of threads per process. Fourth, to not create security holes. Fifth, to handle probe hits as efficiently as possible. Lastly, to simplify porting to different architectures.

Throughout this description, P refers to an object of type probepoint, and S refers to an object of type ssol slot. The SSOL instrumentation process is as follows. When establishing the first probepoint for a process, first divide up the SSOL area into instruction slots. For each slot, create a kernel object of type ssol slot. For each such object, set the object's state member to free, the owner member to null, the instruction member pointing at the instruction slot, and the rwsem member (a read-write semaphore) to unlocked. Also, create a kernel object of type uprobe process. Set this object's ssol lock member (a spinlock) to unlocked.

When establishing a probepoint, create an object in kernel space of type probepoint, and set that object's slot member to NULL and its sem member to unlocked. When a probepoint is hit, run the instrumentation handler, ensure that there is an instruction slot S assigned to that probepoint, and use that slot (pointed to by S's insn member) to store the instruction-copy to be single-stepped out of line. When unregistering a probepoint, if there is an instruction slot assigned to that probepoint, free the slot.

Figure 1:
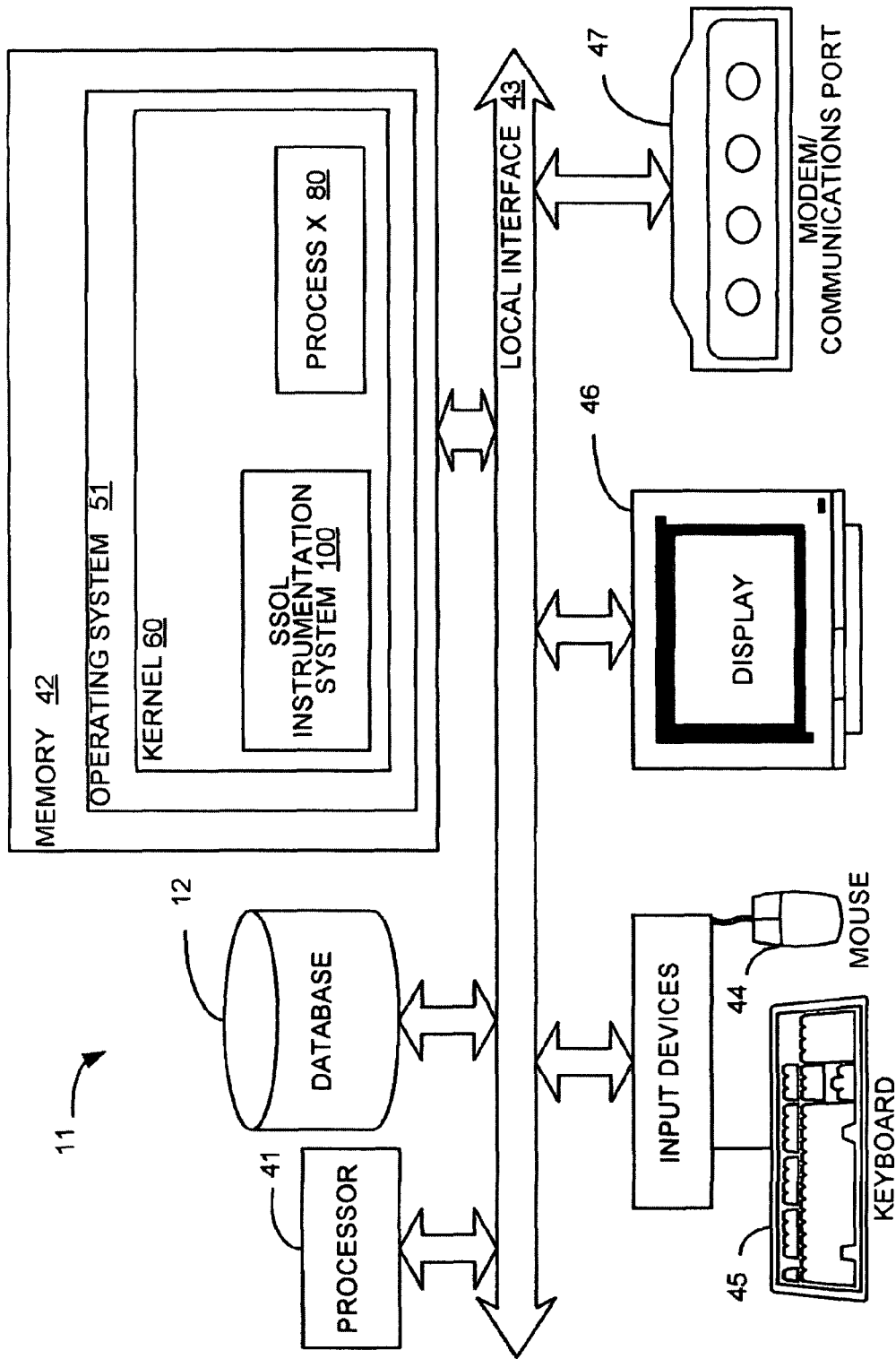
FIG. 1 is a block diagram illustrating an example of a computer utilizing the SSOL instrumentation system of the present invention.

FIG. 1 is a block diagram illustrating an example of a computer 11 utilizing the SSOL instrumentation system 100 of the present invention. Computer 11 includes, but is not limited to, PCs, workstations, laptops, PDAs, palm devices and the like. Generally, in terms of hardware architecture, as shown in FIG. 1, the computer 11 include a processor 41, memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the computer 11, and a semiconductor based microprocessor (in the form of a microchip) or a macroprocessor. Examples of suitable commercially available microprocessors are as follows: an 80x86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 1, the software in the memory 42 includes a suitable operating system (O/S) 51, process X 80 and the SSOL instrumentation system 100 of the present invention. As illustrated, the SSOL instrumentation system 100 of the present invention comprises numerous functional components including, but not limited to, the ensure slot assigned module 120, free slot module 140, acquire slot assigned module 160 and unlock probepoint module 180.

A non-exhaustive list of examples of suitable commercially available operating systems 51 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a Linux operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 51 essentially controls the execution of other computer programs, and provides scheduling, input-output control, file and data management, memory management, and communication control and related services. It is contemplated by the inventors that the SSOL instrumentation system 100 of the present invention is applicable on all other commercially available operating systems.

The SSOL instrumentation system 100 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 51. Furthermore, the SSOL instrumentation system 100 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the computer 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the computer 11 is activated.

When the computer 11 is in operation, the processor 41 is configured to execute software stored within the memory 42, to communicate data to and from the memory 42, and to generally control operations of the computer 11 are pursuant to the software. The SSOL instrumentation system 100 and the O/S 51 are read, in whole or in part, by the processor 41, perhaps buffered within the processor 41, and then executed.

When the SSOL instrumentation system 100 is implemented in software, as is shown in FIG. 1, it should be noted that the SSOL instrumentation system 100 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method.

The SSOL instrumentation system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In an alternative embodiment, where the SSOL instrumentation system 100 is implemented in hardware, the SSOL instrumentation system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
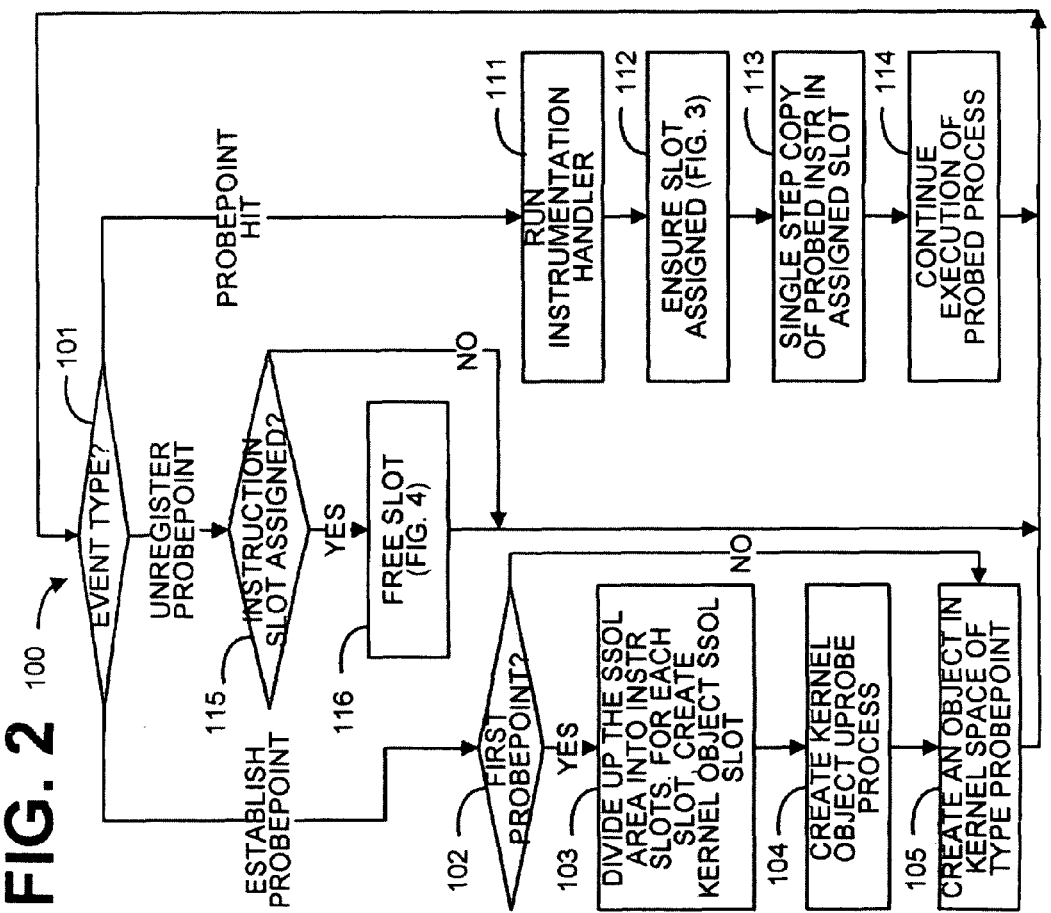
FIG. 2 is a flow chart illustrating an example of the operation of the SSOL instrumentation system of the present invention.

FIG. 2 is a flow chart illustrating an example of the operation of the SSOL instrumentation system 100 of the present invention. The SSOL instrumentation system 100 establishes probepoints for a process, runs the instrumentation handler, when a probepoint is hit, and unregisters a probepoint, when a probepoint is removed from observation.

First at step 101, the SSOL instrumentation system 100 is initialized. This initialization may include startup routines and processes embedded in the BIOS of the computer 11. The initialization also includes the establishment of data values for particular data structures utilized in the SSOL instrumentation system 100.

At step 101, the SSOL instrumentation system 100 waits to receive an event. When an event is received, it is determined what type of an event has occurred. If it is determined at step 101 that an establish probepoint event has occurred, then the SSOL instrumentation system 100 proceeds to step 102 to determine if the probepoint established is the first for process X 80. If it is determined at step 102 that the probepoint being established is not the first for process X 80, then the SSOL instrumentation system 100 proceeds to step 105.

However, if it is determined at step 102 that the first probepoint for a process X 80 is being established, then the SSOL instrumentation system 100 performs the following steps at step 103. First, the SSOL instrumentation system 100 divides up the SSOL area into instruction slots. Next, for each slot, a kernel object type ssol slot is created. For each such object, the SSOL instrumentation system 100 sets the object's state member to free, the owner member to null, the instruction member pointing at the instruction slot, and the read-write semaphore member to unlocked.

At step 104, the SSOL instrumentation system 100 creates a kernel object of type uprobe process. This object's ssol lock member (a spinlock) is set to unlocked.

At step 105, the SSOL instrumentation system 100 creates an object in kernel space of type probepoint, and sets that object's slot member to null and its semaphore member to unlocked. Steps 103-105 can be performed in any order. The SSOL instrumentation system 100 then returns to step 101 to wait for the next event to occur.

If it is determined at step 101 that a probepoint hit event has occurred, then the SSOL instrumentation system 100 proceeds to step 111 to run the appropriate instrumentation handler. The SSOL instrumentation system 100 then ensures that there is an instruction slot S assigned to that probepoint at step 112. The ensure slot assigned process is herein defined in further detail with regard to FIG. 3.

At step 113, the SSOL instrumentation system 100 uses that slot assigned to store the instruction-copy to be single-stepped out of line. At step 114, the SSOL instrumentation system 100 continues the execution of the probe process X 80 and returns to step 1001 to wait for the next event.

If it is determined at step 101 that a unregister probepoint event has occurred, then the SSOL instrumentation system 100 proceeds to step 115 to determine if the instruction slot is assigned. If it is determined at step 115 that there is no instruction slot assigned for the probepoint being unregistered, the SSOL instrumentation system 100 proceeds to step 101 to wait for the next event. However, if it is determined at step 115 that an instruction slot was assigned, then the SSOL instrumentation system 100 frees the slot at step 116. The free slot process is herein defined in further detail with regard to FIG. 4. The SSOL instrumentation system 100 then proceeds to step 101 to wait for the next event.

Figure 3:
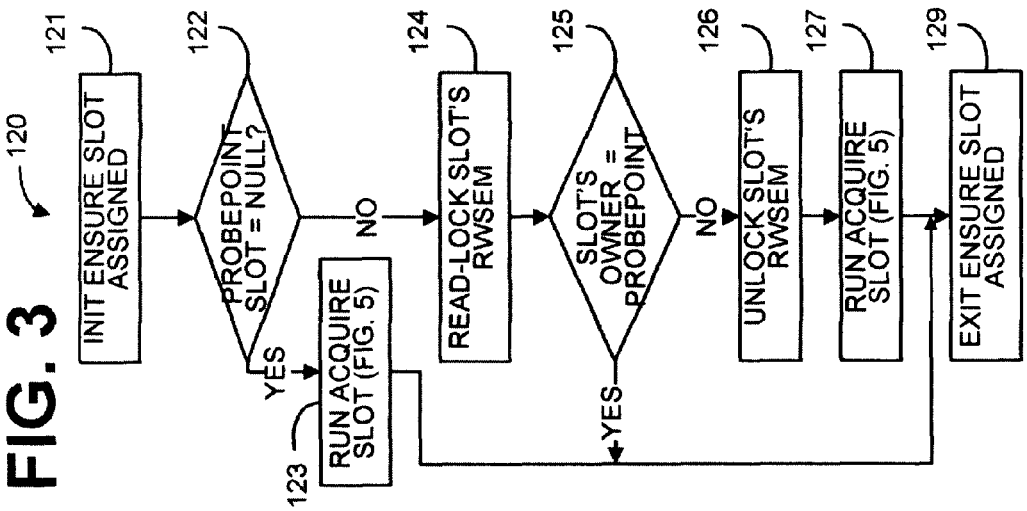
FIG. 3 is a flow chart illustrating an example of the operation of the ensure slot assigned module on the computer that is utilized in the SSOL instrumentation system of the present invention, as shown in FIGS. 1 and 2.

FIG. 3 is a flow chart illustrating an example of the operation of the ensure slot assigned 120 on the computer 11 that is utilized in the SSOL instrumentation system 100 of the present invention, as shown in FIGS. 1 and 2. The ensure slot assigned module 120 is a method for ensuring that an instruction slot is assigned to a probepoint P.

In step 122, it is determined if the probepoint's slot member is null. If it is determined at step 122 that the probepoint slot is equal to null, then the ensure slot assigned module 120 acquires a slot for this probepoint. The acquire slot assigned module is herein defined in further detail with regard to FIG. 5. The ensure slot assigned 120 then proceeds to exit at step 129.

However, if it is determined at step 122 that the probepoint slot is not equal to null, then a read-lock is placed on the slot's read-write semaphore at step 124. This allows multiple threads to use the probepoint's slot simultaneously to single-step at process's X 80 probepoint, but puts all such threads to sleep if the slot is in the process of being stolen.

At step 125, it is determined if the slot's owner is probepoint P. If it is determined that the slot owner is probepoint P, then the ensure slot assigned 120 proceeds to exit at step 129. However, if it is determined that the slot's owner is not probepoint P, then the slot has been stolen and ensure slot assigned 120 unlocks the slot's read-write semaphore at step 126. At step 127, a slot is acquired for this probepoint. The acquire slot assigned module is herein defined in further detail with regard to FIG. 5.

At step 129 the ensure slot assigned 120 then exits.

Figure 4:
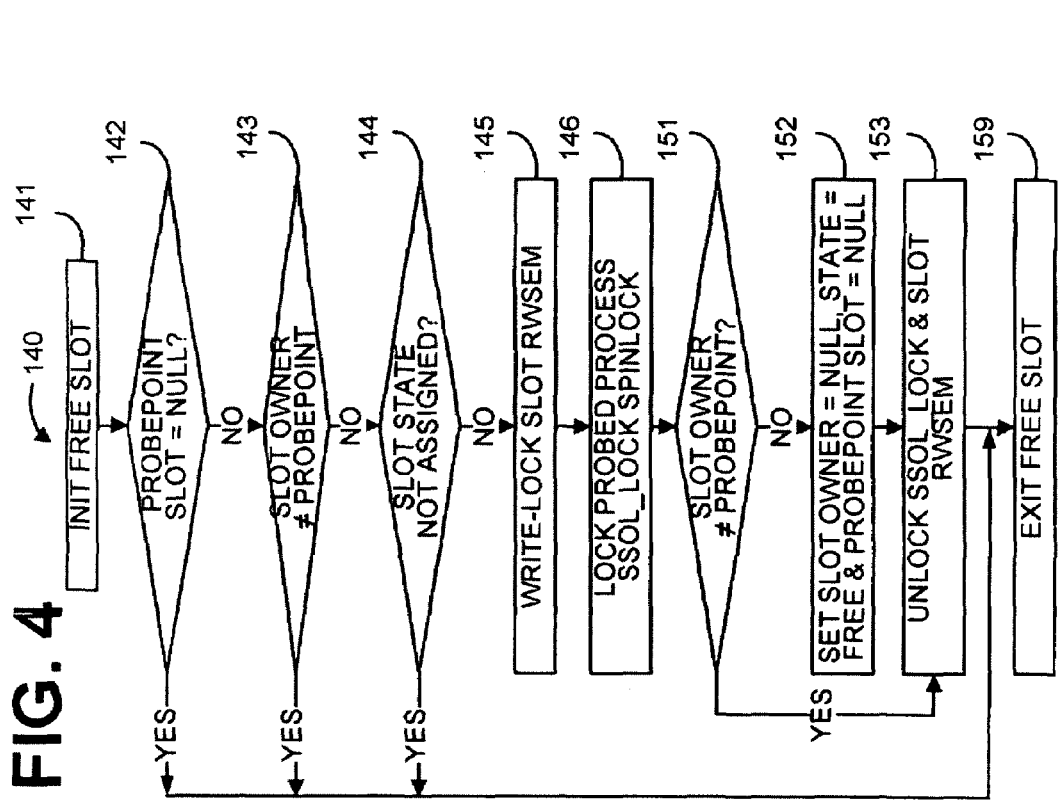
FIG. 4 is a flow chart illustrating an example of the operation of the free slot module on the computer that is utilized in the SSOL instrumentation system of the present invention, as shown in FIGS. 1 and 2.

FIG. 4 is a flow chart illustrating an example of the operation of the free slot module 140 on the computer 11 that is utilized in the SSOL instrumentation system 100 of the present invention, as shown in FIGS. 1 and 2. Free slot module 140 relinquishes the slot owned by probepoint P when probepoint P is being unregistered. It is assumed at this point that probepoint P's semaphore is locked First at step 141, the free slot module 140 is initialized. The initialization may include the establishment of data values for particular data structures utilized in the free slot module 140.

Next step, 142, it is determined if probepoint P's slot is null. If it is determined at step 142 that the probepoint's slot is equal to null, then free slot module 140 proceeds to exit at step 159. However, if the probepoint's slot is not equal to null, then free slot module 140 determines if the slot's owner is not equal to probepoint P, at step 143. If it is determined at step 143, the slot's owner is not equal to probepoint P, then free slot module 140 proceeds to exit at step 159. However, if the slot's owner is equal to probepoint P, then it is determined at step 144 if the slot's state is not assigned. If it is determined at step 144 that the slot's state is not assigned, then free slot module 140 proceeds to exit at step 159.

However, if it is determined at step 144 that the slot's state is assigned, then the free slot module 140 performs a write-lock on the slot's read-write semaphore at step 145. At step 146, a lock is placed on the probed process's ssol_lock spinlock.

At step 151, it is determined if the slot's owner is not equal to probepoint P. If slot's owner is not probepoint P, then another thread stole the slot, and free slot module 140 proceeds to step 153. If slot's owner is equal to probepoint P, then the slot's owner is set to null, the slot's state is set to free and probepoint's slot is set to null.

At step 153, the free slot module 140 unlocks the ssol_lock and the slot's read write semaphore. At step 159, free slot module 140 exits.

FIG. 5 is a flow chart illustrating an example of the operation of the acquire slot assigned module 160 on the computer that is utilized in the SSOL instrumentation system 100 of the present invention, as shown in FIGS. 1 and 2. An instruction slot is acquired for a probepoint P. This slot stores the original instruction from the probed process X 80 so that it can be single-stepped. The method for acquiring a slot for probepoint P is as follows.

First at step 161, the acquire slot assigned module 160 is initialized. The initialization may include the establishment of data values for particular data structures utilized in the acquire slot assigned module 160.

Next step, 162, the acquire slot assigned module 160 locks probepoint P's semaphore. Next at 163, it is determined whether probepoint P's slot member is non-null and that slot's probepoint owner is probepoint P. If it is determined at step 163 that probepoint P's slot member is null or that slot's probepoint owner is not probepoint P, then acquire slot assigned module 160 proceeds to step 166.

However, if it is determined at step 163 that probepoint P's slot member is non-null and that slot's probepoint owner is probepoint P, then it can be assumed that another thread has acquired a slot for probepoint P. The acquire slot assigned module 160 then must unlock probepoint P at step 164. The unlock probepoint is herein defined in further detail with regard to FIG. 6. At step 165, it is determined if the acquire slot assigned module 160 is done. If it is determined at 165 that the acquire slot assigned module 160 is not done, then the acquire slot assigned module 160 proceeds to step 166. However, if it is determined at step 165 that acquire slot assigned module 160 is done, the acquire slot assigned module 160 proceeds to step 179 to exit.

At step 166, the probe process's ssol_lock spinlock is locked. At step 167, a slot is selected to acquire, and its state member is set to stolen. In alternative embodiments, a variety of heuristics could be used to select the optimum slot. Presumably, the first choice would be a free slot, and the last choice would be a slot in the stolen state (i.e., currently being stolen by another thread). If there are no free slots, it would presumably be preferable to steal a slot that has been used (for single-stepping) less recently (i.e. least recently used method) than other slots.

At step 171, the ssol_lock spinlock is unlocked. A write-lock of slot's read/write semaphore is set at step 172. At step 173, the slot's state is set to assigned, its owner is set to probepoint P, and probepoint P's slot member is set to the slot. At step 174, the slot's read/write semaphore is unlocked. At step 175, the probepoint semaphore is unlocked.

At step 179, acquire slot assigned module 160 then exits.

Figure 6:
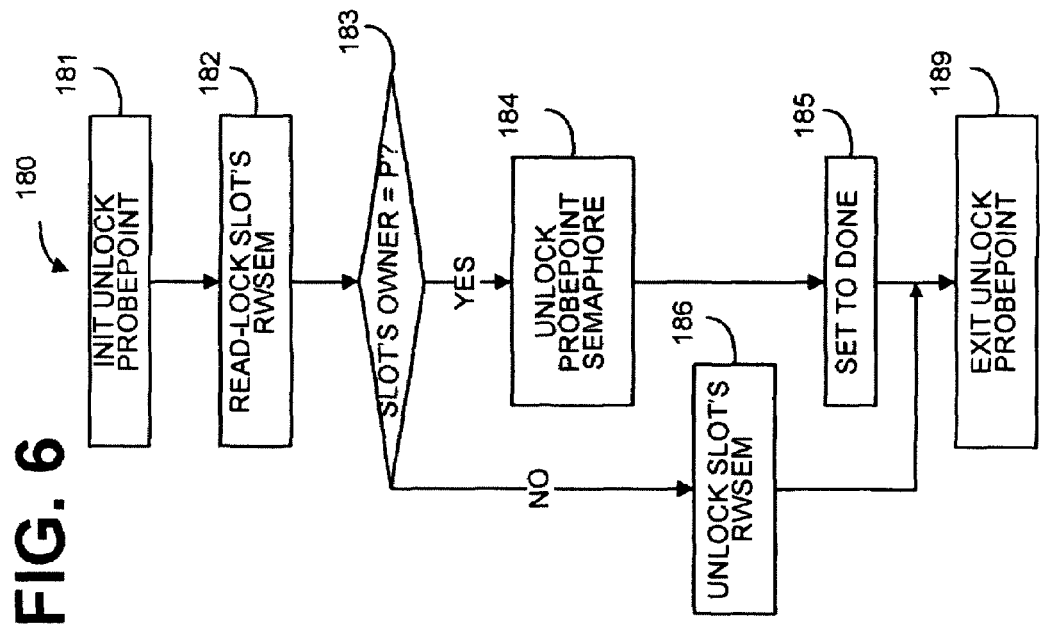
FIG. 6 is a flow chart illustrating an example of the operation of the unlock probepoint module on the computer that is utilized in the SSOL instrumentation system of the present invention, as shown in FIGS. 1 and 2.

FIG. 6 is a flow chart illustrating an example of the operation of the unlock probepoint module 180 on the computer that is utilized in the SSOL instrumentation system 100 of the present invention, as shown in FIGS. 1 and 2. The unlock probepoint module 180 unlocks the probepoint P's semaphore if the slot S associated with probepoint P is owned by P.

First at step 181, the unlock probepoint module 180 is initialized. The initialization may include the establishment of data values for particular data structures utilized in the unlock probepoint module 180.

Next step, 182, a read-lock is placed on the read-write semaphore (i.e. rwsem) for slot S. At step 183, unlock probepoint module 180 verifies that slots S's owner is still P. If so, P's semaphore is unlocked at step 184, and status is set to done at step 185. Otherwise, unlock probepoint module 180 unlocks the slots's read-write semaphore (i.e. rwsem) at step 186. The unlock probepoint module 180 and exits at step 189.

The present invention can take the form of an entirely hardware embodiment, an entirely software embodiment or an embodiment containing both hardware and software elements. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A probe system for multithreaded user-space programs, the system comprising:
    an instrumentation module that enables single stepping out of line processing for multithreaded programs;
    an establish probepoint module that divides up an area of the probed program's memory into a plurality of instruction slots;
    an ensure slot assigned module that ensures that a instruction slot is assigned to a probepoint;
    a slot acquisition module that acquires the instruction slot for the probepoint, by stealing the instruction slot from another probepoint as needed;
    wherein the stealing the instruction slot from the other probepoint as needed comprises:
        checking for an occurrence in which an owner for the instruction slot equals the other probepoint;
        in response to an occurrence in which the owner for the instruction slot does not equal the other probepoint, determining that a different probepoint already stole the instruction slot and unlocking a write semaphore for the instruction slot; and
        in response to the occurrence in which the owner for the instruction slot equals the other probepoint, setting the owner for the instruction slot to null and unlocking the write semaphore for the instruction slot; and
    a free slot module that relinquishes the instruction slot owned by the probepoint when the probepoint is being unregistered.

2. The system of claim 1, wherein the least recently used slot of a plurality of instruction slots is stolen if no slots are free.

3. The system of claim 1, wherein the establish probepoint module creates a single stepping out of line slot data structure for each of the plurality of instruction slots.

4. A method for user-space probes for multithreaded programs, comprising:
    enabling single stepping out of line processing for multithreaded programs;
    dividing a memory area into a plurality of instruction slots;
    ensuring that an instruction slot is assigned to a probepoint;
    acquiring the instruction slot for the probepoint, stealing the instruction slot from another probepoint as needed;
    wherein the stealing the instruction slot from the other probepoint as needed comprises:
        checking for an occurrence in which an owner for the instruction slot equals the other probepoint;
        in response to an occurrence in which the owner for the instruction slot does not equal the other probepoint, determining that a different probepoint already stole the instruction slot and unlocking a write semaphore for the instruction slot; and
        in response to the occurrence in which the owner for the instruction slot equals the other probepoint, setting the owner for the instruction slot to null and unlocking the write semaphore for the instruction slot; and
    relinquishing the instruction slot owned by the probepoint when the probepoint is being unregistered.

5. The method of claim 4, wherein the least recently used slot of a plurality of instruction slots is stolen if no slots are free.

6. The method of claim 4, further comprising,
    creating a single stepping out of line slot data structure for each of the plurality of instruction slots.

* * * * *